Patented Oct. 14, 1924.

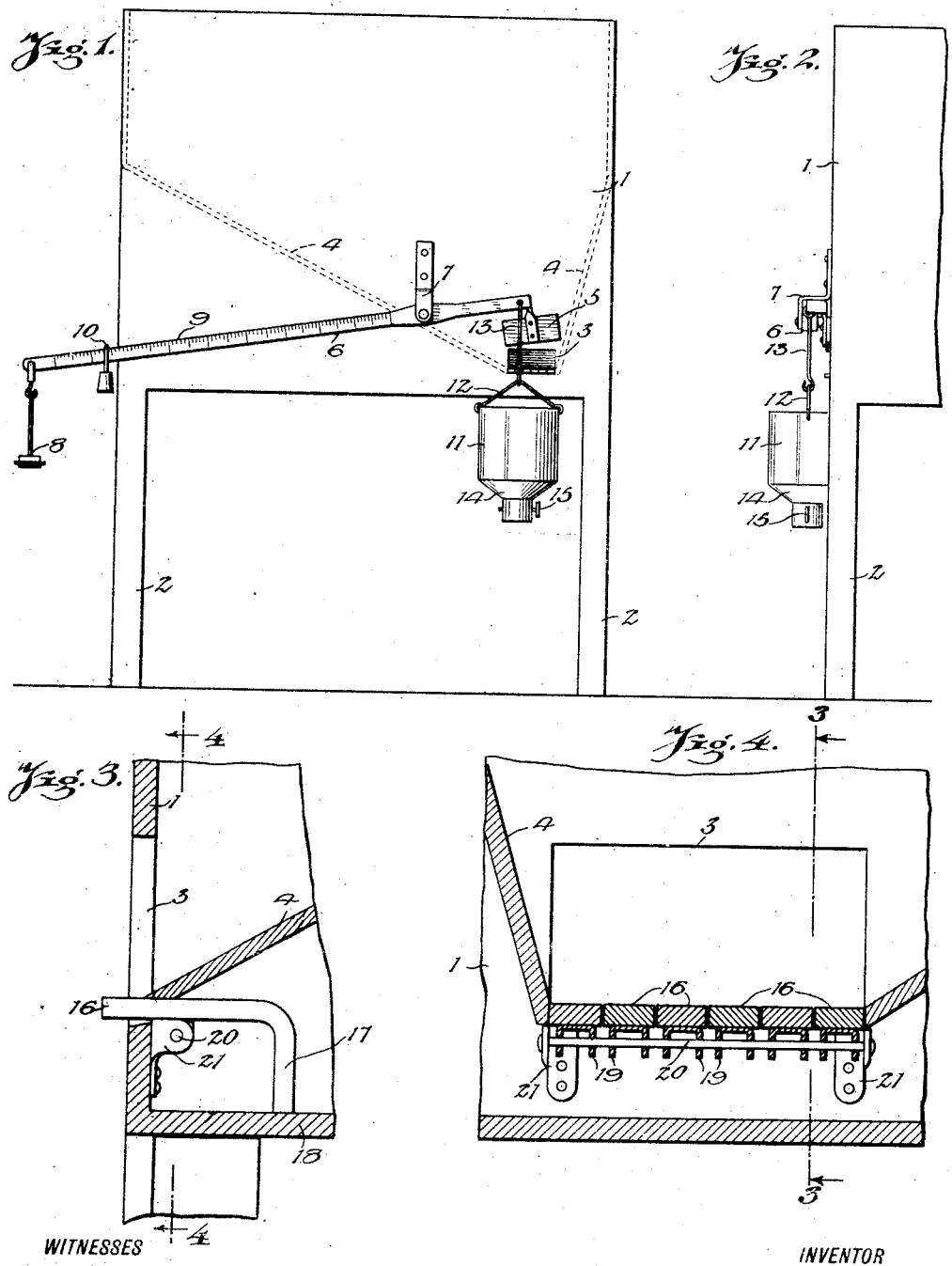

1,511,950

UNITED STATES PATENT OFFICE.

ALFRED DEBAY, OF TARENTUM, PENNSYLVANIA.

BIN SCALE.

Application filed February 6, 1923. Serial No. 617,329.

*To all whom it may concern:*

Be it known that I, ALFRED DEBAY, a citizen of the United States, and a resident of Tarentum, in the county of Allegheny and State of Pennsylvania, have invented a new and Improved Bin Scale, of which the following is a full, clear, and exact description.

This invention relates to improvements in bin scales, an object of the invention being to provide an improved means controlling the discharge or outlet of material so that only the desired quantity will be permitted to discharge, or measure, at each operation, and which is so constructed as to prevent particles of material from interfering with the perfect closure, or cutting off, of the discharge.

A further object is to provide a mechanism of the character stated which can be made to handle any loose material, which will operate automatically, and which will accurately measure material in quantities exactly as desired.

With these and other objects in view, the invention consists in certain novel features of construction and combinations, and arrangement of parts, as will be more fully hereinafter described and pointed out in the claims.

In the accompanying drawings—

Figure 1 is a view in side elevation illustrating my improved apparatus, showing the gate in open position, which is the discharging position of the bin, the material being omitted for clearness.

Figure 2 is a view in elevation in right angles to Figure 1.

Figure 3 is an enlarged fragmentary view in section, taken on the line 3—3, of Figure 4 to illustrate the discharge platform structure.

Figure 4 is a view in section on the line 4—4, of Figure 3.

1 represents a bin which is preferably supported at an elevation upon suitable legs 2 and provided with an outlet opening 3, and suitably inclined bottom walls 4 directing the material in the bin to the discharge opening 3.

While my apparatus is especially adapted for handling grain and smaller material of this character, it is obvious that my invention is not limited either as to the relative size of the parts, the quantities to be measured or to the materials measured, and I do not limit myself in such particulars, as the invention is adapted for a wide range of utility.

The opening 3 is normally closed by a gate 5 which is connected to one end of a scale beam 6, the latter pivotally supported on a bracket 7 adjacent to one end of the beam, so that the gate 5 is connected to the shorter end of the beam, and on the longer end of the beam a weight carrier 8 is pivotally connected. This longer end of the beam 6 is also provided with a scale 9 and an adjustable weight 10 thereon, to regulate, or control the time of operation in accordance with the quantity of material dispensed at each operation.

A measuring receptacle 11 is pivotally connected by a bail 12 and a link 13 to the shorter end of the beam 6, and this receptacle 11 is funnel shaped at its bottom as shown at 14, and provided with a valve, or cock 15 to open and close the same.

It is to be understood that bags or other receptacles will be located under the receptacle 11 and receive the discharge therefrom so that said bags or other receptacles will each receive a like amount of material.

16 represents platform sections which are arranged in a parallel series and project through the lower portion of the opening 3. These platform sections 16 are of general angular form, as shown most clearly in Figure 3, so that their horizontal portions constitute a platform and their vertical portions 17 constitute counter balanced standards, normally resting on the bottom of bin 1. The horizontal portions of the platform sections 16 are pivotally connected by brackets 19 to a rod 20 which is supported in bearing brackets 21 fixed to the bin wall.

It will be noted that the platform sections 16 project through the discharge opening 3 and serve as a stop to limit the downward movement of gate 5. If a grain or particle should rest upon one of the platform sections 16, instead of preventing the closing of the gate 5 it would simply operate to depress one of the sections 16, and allow the gate 5 to completely close, and when the gate is again opened the outward rush of material will carry such grain or particle with it and the platform section will resume its normal position.

The operation is as follows;

With the parts as shown in Figure 1 the material discharges through the opening 3 into receptacle 11 and when the weight of such material in receptacle 11 reaches the desired measure the scale beam 6 will be lifted and the gate 5 moved downwardly to closed position. When the contents of receptacle 11 are discharged, the parts would automatically return to the position shown in Figure 1 to repeat the operation.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. An apparatus of the character described, comprising a bin having a discharge opening therein, a scale, a gate operatively connected to the scale and adapted to close said opening, a receptacle connected to the scale and located in a position to receive the discharge from said opening, and movable platform sections located in the discharge opening and in the path of movement of the gate.

2. An apparatus of the character described, comprising a bin having a discharge opening therein, a scale, a gate operatively connected to the scale and adapted to close said opening, a receptacle connected to the scale and located in a position to receive the discharge from said opening, and movable platform sections located at the discharge opening and in the path of movement of the gate, said platform sections comprising pivoted angle bars with the inner portions of said bars supported normally on the bin bottom and counter balanced to maintain the sections normally in operative position.

3. The combination with a bin having a discharge opening therein, and a gate normally closing said opening, of platform sections pivotally mounted in the bin and projecting into the discharge opening in the path of the gate.

4. The combination with a bin having a discharge opening therein, and a gate normally closing said opening, of platform sections pivotally mounted in the bin and projecting into the discharge opening, a scale beam pivotally connected to the bin, a measuring receptacle connected to the beam, said gate also connected to the beam, and adjustable weights on the beam for regulating the operation thereof.

5. The combination with a bin having a discharge opening, of a scale beam pivoted at one side of its center of length to the bin, a gate secured to the shorter end of the scale beam, a measuring receptacle suspended from the said shorter end of the scale beam, and means for limiting the downward movement of the gate.

ALFRED DEBAY.